J. A. ROCHE.
Band Sawing-Machines.
No. 155,754. Patented Oct. 6, 1874.
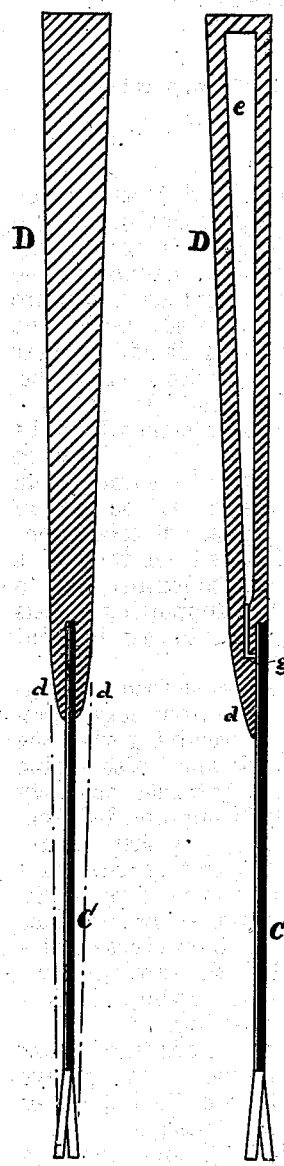
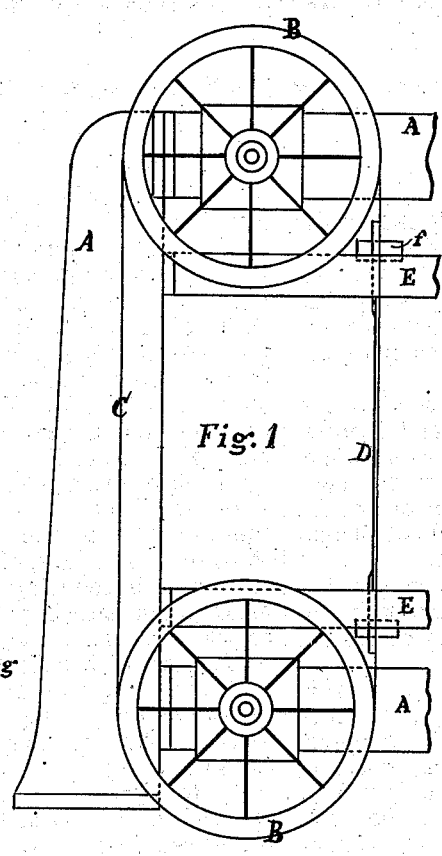
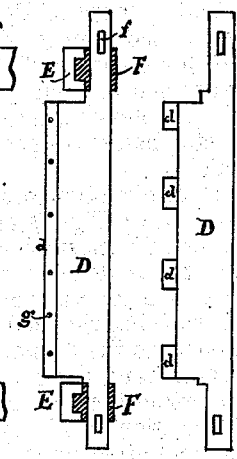
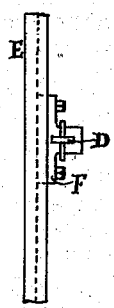
Witnesses:
Julius Wilcke
C. W. Bond
Inventor:
John A. Roche

UNITED STATES PATENT OFFICE.

JOHN A. ROCHE, OF CHICAGO, ILLINOIS.

IMPROVEMENT IN BAND SAWING MACHINES.

Specification forming part of Letters Patent No. 155,754, dated October 6, 1874; application filed February 9, 1874.

*To all whom it may concern:*

Be it known that I, JOHN A. ROCHE, of the city of Chicago, in the county of Cook and State of Illinois, have invented certain new and useful Improvements in Band Sawing Machines, of which the following is a full description, reference being had to the accompanying drawings, in which—

Figure 1 is a front elevation with a portion of the frame cut away; Figs. 2 and 3, cross sections of the saw and back support or wedge, full size; Figs. 4 and 5, side views of the back-support; and Fig. 6, a top view of one of the beams or braces, showing the mode of fastening the back-support to the frame.

The use of belt or band saws, owing to the difficulty of supporting them at the back and keeping them in position, has been heretofore confined to scroll and other light sawing.

The object of my invention is to provide such saws with a strong backing, so that heavy sawing, such as sawing timber and logs into boards, can be done with them, or the re-sawing of boards of some considerable width; and its nature consists in providing the back of the saw with a continuous support, and in the combinations hereinafter claimed.

In the drawings, A indicates a frame-work; B, the wheels upon which the saw is strained, and by which it is carried; C, the saw; D, the back-support; E, the beams, by which the backing plate or wedge is supported and held in position; F, heads for securing or straining the backing support; $d$, edges of backing-plate brought to a sharp, or nearly sharp edge, in front; $e$, space formed when the backing-plate is made of sheet metal; $f$, keys for securing the backing-plate; and $g$, holes for admitting oil.

When the backing-plate is designed to be used in a re-sawing-machine I make it in the form shown at Fig. 2—that is, with the sides equal. When for sawing logs I make one side wedge shape and the other in line with the saw, as shown at Fig. 3. Either form may be made solid and be planed or grooved out at the front edge, as shown, or they may be made of sheet metal of sufficient strength. When made hollow the space $e$ may be filled with grease, oil, or other suitable lubricating material, which will work out gradually through the holes $g$. I prefer to make these backing-plates, D, of steel, but other metals may be used, and I make them to extend the entire width of the article to be sawed, and for the purpose of properly securing, it will be best to make them extend the entire distance between the bars E. The heads F I make of cast-iron, and attach them permanently to the sides of the bars E, but the ends of D can be mortised through the bars E by making them stronger. I also propose to put several of these saws in position in rear of each other, so as to form a gang of saws when the mill is to be used in reducing logs to lumber, and to arrange the carrying and supporting wheels so that they can be adjusted to saw different thicknesses of boards.

By providing these band-saws with backing-plates having grooves in the front edge I prevent kinking, buckling, or trembling when the saws are doing heavy work, and I also enable them to withstand a heavy thrust, or heavy or rapid feeding without being crowded from the wheels B and without giving them an unusual strain over or on the driving and carrying wheels, and the wedge form of the backing-plates spreads the work, so as to reduce the friction on the saw, and in use these plates steady the work as well as the saw, and prevent scratching and uneven sawing, which is especially desirable in re-sawing.

When the backing-plate is made in the form shown at Fig. 3—that is, with the saw-groove in the side—the log will form the balance of the guide and keep the saw steady.

The back-support will be found useful in sawing logs even when not provided with a groove at or in its front edge, and not made wedge shape, as it will support and steady the saw and the log or board when no thicker than the saw-kerf, as it follows in with the saw.

The guide can be made horizontally adjustable, and with this continuous guide the frame may be turned down, so that the saws may cut horizontally instead of vertically, if desired.

I am aware that guides in band sawing machines have long been in use, and I do not therefore claim such device; but

What I claim as new, and desire to secure by Letters Patent, is—

The backing-plate D, constructed with the parts $d\ g$, in combination with the bars E E, and extending the entire distance between said bars, thus adapting the machine for heavy work, all constructed and arranged for operation as and for the purpose specified.

JOHN A. ROCHE.

Witnesses:
L. L. BOND,
O. W. BOND.